US007242850B2

United States Patent
Cok

(10) Patent No.: US 7,242,850 B2
(45) Date of Patent: Jul. 10, 2007

(54) FRAME-INTERPOLATED VARIABLE-RATE MOTION IMAGING SYSTEM

(75) Inventor: Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1088 days.

(21) Appl. No.: 09/792,314

(22) Filed: Feb. 23, 2001

(65) Prior Publication Data

US 2003/0016750 A1 Jan. 23, 2003

(51) Int. Cl.
H04N 5/91 (2006.01)
(52) U.S. Cl. .................. 386/73; 348/448; 348/459; 348/700; 348/701; 386/117; 386/52
(58) Field of Classification Search ........... 348/448, 348/700, 701, 412.1, 416.1, 155, 208; 386/4–8, 386/38, 52, 55, 68–70, 81–82, 117
See application file for complete search history.

(56) References Cited

U.S. PATENT DOCUMENTS

| 3,723,644 | A | | 3/1973 | Haskell et al. |
|---|---|---|---|---|
| 5,327,243 | A | * | 7/1994 | Maietta et al. ............. 348/565 |
| 5,389,965 | A | | 2/1995 | Kuzma |
| 5,535,011 | A | * | 7/1996 | Yamagami et al. ......... 386/117 |
| 5,552,829 | A | | 9/1996 | Kim et al. |
| 5,828,786 | A | | 10/1998 | Rao et al. |
| 5,893,062 | A | * | 4/1999 | Bhadkamkar et al. ...... 704/270 |
| 6,151,075 | A | * | 11/2000 | Shin et al. .................. 348/459 |
| 6,192,079 | B1 | | 2/2001 | Sharma et al. |
| 6,222,589 | B1 | * | 4/2001 | Faroudja et al. ............ 348/448 |
| 6,317,165 | B1 | * | 11/2001 | Balram et al. .............. 348/699 |
| 6,351,545 | B1 | * | 2/2002 | Edelson et al. ............ 382/107 |
| 6,469,744 | B1 | * | 10/2002 | Pearlstein ................... 348/554 |
| 6,505,977 | B2 | * | 1/2003 | Corbin et al. ............... 396/567 |
| 6,542,198 | B1 | * | 4/2003 | Hung et al. ................. 348/459 |
| 6,580,466 | B2 | * | 6/2003 | Siefken ...................... 348/700 |
| 2002/0149696 | A1 | * | 10/2002 | Cok et al. .................. 348/459 |

FOREIGN PATENT DOCUMENTS

| JP | 2000-069485 | 3/2000 |
|---|---|---|
| WO | WO 99/67590 | 12/1999 |

* cited by examiner

Primary Examiner—Thai Q Tran
Assistant Examiner—Helen Shibru
(74) Attorney, Agent, or Firm—Peyton C. Watkins; Stephen H. Shaw

(57) ABSTRACT

A method of recording and processing a digital motion image sequence, includes the steps of: recording a digital motion image sequence at a capture frame rate; determining different effective image content change rates as a function of the scene content changes in different portions of the image sequence; and processing the digital motion image sequence to produce a processed digital motion image sequence having portions with the selected effective change rates.

36 Claims, 3 Drawing Sheets

FRAME-INTERPOLATED VARIABLE-RATE MOTION IMAGING SYSTEM

FIELD OF THE INVENTION

The present invention relates to an improved system for motion imaging display. In particular, sequential image frames are interpolated at a variable rate to optimize the motion image quality.

BACKGROUND OF THE INVENTION

Motion imaging systems have been in use for over one hundred years. These systems rely upon the capture and presentation of a sequential series of still images. If the sequence is presented at a sufficiently rapid rate, the human eye and brain does not perceive the images as separate, still images but rather as a smooth sequence of moving images similar to what is perceived in the real world. The minimum rate at which the images are captured or presented varies somewhat in different imaging systems. For example, traditional motion picture film is typically acquired and presented at 24 frames per second. Standard NTSC television presents 30 frames per second while PAL uses 25. Image sequences are sometimes acquired at one rate and presented at another for artistic effect, for example to create slow motion effects.

Higher presentation frame rates can provide more pleasing presentation of changes in scene content (such as, pans, object motion, or scene changes) by increasing the observable detail in the frames, reducing blur, and smoothing the motion. Thus, the frame rate necessary to maintain the illusion of smooth motion will depend on the nature and content of the scene. The situation is complicated by the viewer's behavior. For example, the amount and location of detail that is perceived in a motion sequence depends, at least in part, on whether the viewer's eyes track a moving object in the sequence. Hence, the necessary frame rate for optimal viewing of a motion image sequence depends on the nature of the imagery and the behavior of the viewer as well as the viewing environment.

Today, motion imaging can be realized with either traditional motion picture films or with electronic imaging devices, either analog or digital. Digital motion image sequences are very profligate with computing resources, requiring huge amounts of storage, high-resolution capture and presentation devices, massive computational needs, and a large bandwidth for communication. Since the amount of image data is dependent to a very great extent upon the frame rate, any digital imaging system requires a balance between the amount of image data and the perceived motion image quality.

The modification of a motion sequence frame rate for both capture and display is known in the prior art. U.S. Pat. No. 3,723,644 issued Mar. 27, 1973 to Haskell et al. describes a system for analyzing the motion content of an imaging sequence and adjusting the frame capture rate to complement the motion detected. Frames are counted and the count used to specify the frame repetition rate at playback thus reducing transmission bandwidth requirements. WO 99/67590 published Dec. 29, 1999 describes varying the presentation frame rate of an image sequence to prevent piracy. Tradeoffs between frame rate and image detail are also known. U.S. Pat. No. 5,389,965 issued Feb. 14, 1995 to Kuzma describes an image sequence transmitted over a fixed bandwidth channel wherein the frame rate is increased when image detail is decreased.

Image sequences acquired at one fixed frame rate can be converted and displayed at another frame rate. For example, film-based image sequences acquired at 24 frames per second can be displayed at 30 frames per second for television broadcast in real-time. These conversions are achieved either by replicating (repeating) frames or by temporally interpolating new frames between existing ones.

Today, image sequences are captured at a fixed frame rate although post-processing can reduce the frame rate for compression or communication purposes. The cost of increasing the capture frame rate is prohibitive, particularly for motion picture film, since the amount of film used is increased according to the increase in frame rate. Moreover, even if the image sequences are acquired or stored digitally at a higher rate, the concomitant increase in computing resources, communication bandwidth, etc. is problematic.

There is a need, therefore, for a motion imaging system that optimizes the motion quality and minimizes the computing resources needed to store, manipulate, and communicate a digital motion image sequence.

SUMMARY OF THE INVENTION

This need is met according to the present invention by providing a method of recording and processing a digital motion image sequence that includes the steps of: recording a digital motion image sequence at a capture frame rate; determining different effective image content change rates as a function of the scene content changes in different portions of the image sequence; and processing the digital motion image sequence to produce a processed digital motion image sequence having portions with the selected effective change rates.

ADVANTAGES

The present invention has the advantage of increasing the motion image quality of a motion image sequence while reducing the communication, computation and storage costs for the motion image sequence.

DETAILED DESCRIPTION OF THE INVENTION

The present invention is a method for the presentation of digital motion image sequences at different effective image content change rates (effective rate). The effective rate is the rate at which image content changes within a portion of a motion image sequence. Digital motion image sequences are originally captured at specific frame rates. The changes within a sequence of images determines the effective rate and depends upon the frame-to-frame changes in scene content within the image sequence. According to the present invention, the digital motion image sequence is first analyzed to determine an effective rate and then processed to create a motion image sequence whose image content change can be presented at the effective rate. If the digital motion image sequence is displayed at a frame rate lower than the effective rate, the changes in scene content in the sequence will not be smooth and will look jerky or jittery. If the digital motion image sequence is displayed at a frame rate higher than the effective frame rate, the motion in the sequence will be smooth but more frames than necessary will be used to reproduce the image sequence so that digital imaging resources will be wasted.

The effective rate may be different in different portions of an image sequence. In some portions very few frames are needed to effectively reproduce changes in the scene content. In other portions, many more frames will be needed to effectively reproduce the changes in scene content.

Figure 1:
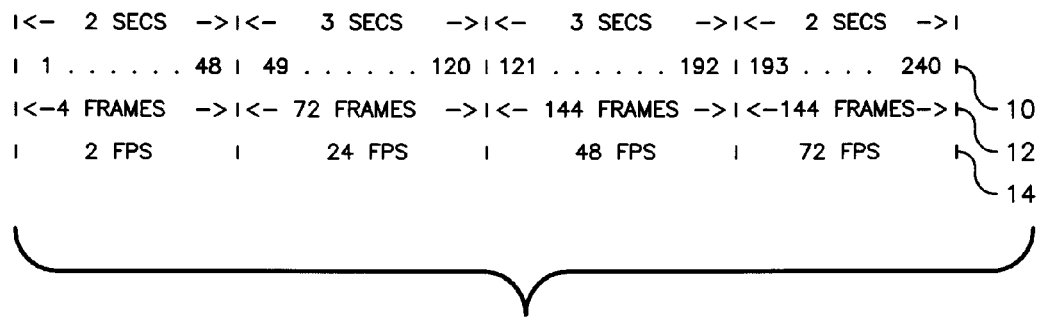
FIG. 1 is a diagram useful in describing an effective image content change rate according to the present invention.

Referring to FIG. 1, an example of a 10-second, 240-frame motion image sequence with an original frame timeline 10 and an effective frame timeline 12. Frames one through 48 can be effectively represented with four frames presented over two seconds. Frames 49 through 120 can be effectively reproduced with 72 frames over three seconds. Frames 121 through 192 can be effectively reproduced with 144 frames over three seconds. Frames 193 through 240 can be effectively reproduced with 144 frames over two seconds. The total elapsed time for the motion image sequence remains the same—ten seconds—but the number of total frames in the sequence and the number of effective frames per second varies throughout the sequence. The effective frame rate 14 varies to effectively reproduce scene content changes. In every case, the apparent changes in the scene proceed at the rate that they were originally captured, i.e. the time scale has not changed.

Where the effective frame rate is less than the original frame rate, the reduction in frames can be readily accomplished by deleting frames, by replacing a number of frames with an average over multiple frames, or by interpolating a representative frame for the multiple frames in the motion image sequence to create an image sequence having the effective frame rate. Where the effective frame rate is greater than the original capture frame rate, additional frames can be created by frame interpolation to create an image sequence having the effective frame rate. Frame interpolation is the process of creating new frames within an image sequence by analyzing the contents of frames prior and subsequent to the new frame and constructing the new frame from the data in the prior and succeeding image frames. There are a variety of computational techniques known in the art to accomplish this, in particular, the use of motion vector analysis and estimation. Preferably, motion vector analysis and interpolation is used. For example, the Cineon system from Eastman Kodak provides such a tool. Alternatively, well known image morphing techniques can be used to construct interpolated image frames.

Figure 2:
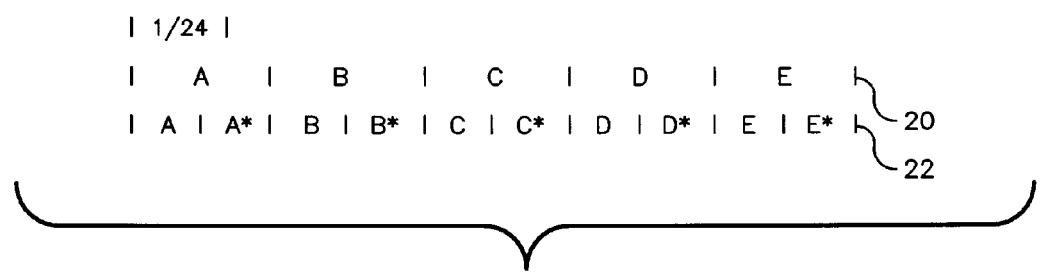
FIG. 2 is a diagram useful in describing an interpolated image sequence according to the present invention.

Referring to FIG. 2, a motion image sequence 20 is originally captured at 24 frames per second. Because of the changes in scene content, an effective change rate of 48 frames per second is selected for display. To create this faster frame rate sequence, the image sequence 20 is processed. An interpolated frame (represented with an asterisk) representing a frame that is midway between the original frames is calculated and inserted between each pair of original frames to create a processed, interpolated image sequence 22. The frames of the processed image sequence can then be displayed at the effective rate of 48 frames per second.

Figure 3:
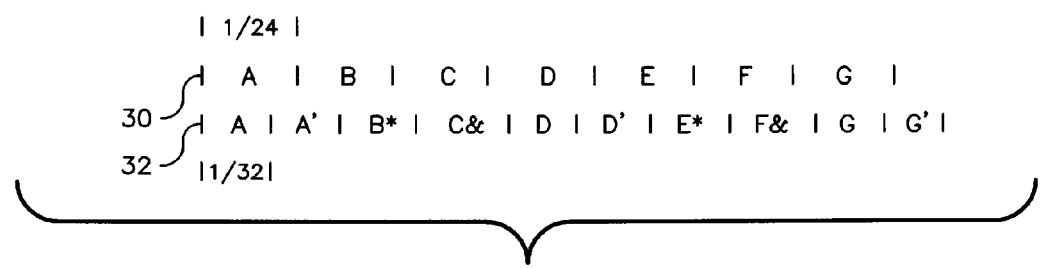
FIG. 3 is a diagram useful in describing another interpolated image sequence according to the present invention.

FIG. 3 illustrates a more complex example. In FIG. 3 an original motion image sequence 30 is captured at 24 frames per second and the effective frame rate is determined to be 32 frames per second. The image sequence is interpolated to create a processed sequence 32 having an effective rate of 32 frames per second, however in this example only every third original frame is retained while the others are interpolated. Frames marked with an apostrophe are interpolated at a point three quarters between the two frames, frames marked with an asterisk are interpolated at a point midway between frames, while frames marked with an ampersand are interpolated at a point one quarter of the way between frames.

Figure 4:
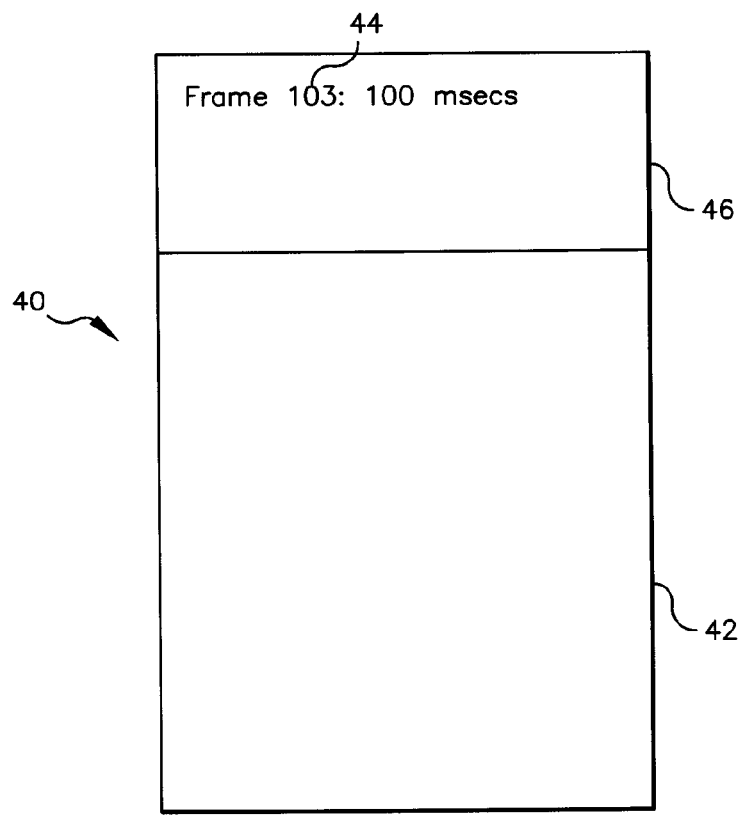
FIG. 4 is an illustration of a prior art image storage format.

Presentation of an effective frame rate motion image sequence can be accomplished in two different ways. In one embodiment, a presentation device can display a frame for an arbitrary amount of time. In this embodiment, each frame in the processed digital motion image sequence has an associated duration which is used to specify the length of time for which the frame is presented. This duration can vary from frame to frame in the sequence. To accomplish this, each frame in the image sequence is accompanied by meta-data information describing the frame rate (or exposure time) for each frame in the image sequence. This information can be stored in a frame file header or in additional descriptive information associated with but stored separately from, an image frame file. The techniques for storing information with a digital image are very well known in the art. FIG. 4 illustrates a storage format 40 for storing the images 42 and meta-data 44 in a file header 46 as is known in the prior art.

Figure 5:
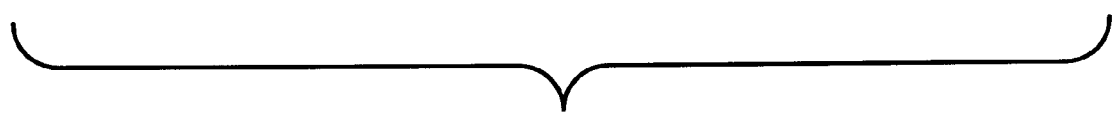
FIG. 5 is a diagram useful in describing an interpolated image sequence including replicated frames according to the present invention.

In a second embodiment, the presentation device operates at a fixed presentation frame rate which is an integral multiple of any of the effective frame rates within the motion image sequence. Each frame has an associated replication value representing the number of times each frame is to be presented so as to present the frames at the effective rate. This technique is illustrated in FIG. 5, wherein an original sequence is captured at 24 frames per second but has effective rates of 24, 32, and 48 for different portions of the image sequence. The lowest common multiple of these effective rates is 96, the presentation rate. Each portion is interpolated (as illustrated in FIGS. 2 and 3). In the example of FIG. 5, portion 60 has an effective rate of 24 so each frame is displayed four times, portion 62 has an effective rate of 32 so each frame is displayed three times, and portion 64 has an effective rate of 48 so each frame is displayed two times. When stored, replicated frames can be stored multiple times or, more efficiently, a meta-data replication count can be associated with each frame and used by the presentation device.

Because the lowest common multiple of the various effective frame rates within an image sequence can readily become very large, it is expedient to limit the number of allowed effective rates (thereby limiting the maximum presentation frame rate). This is readily accomplished by rounding an effective frame rate for a portion of an image sequence to the next highest allowed frame rate. While increasing the effective frame rate requires more frames and image data than strictly necessary, doing so limits the physical requirements of the presentation system and potentially simplifies the system hardware.

Figure 6:
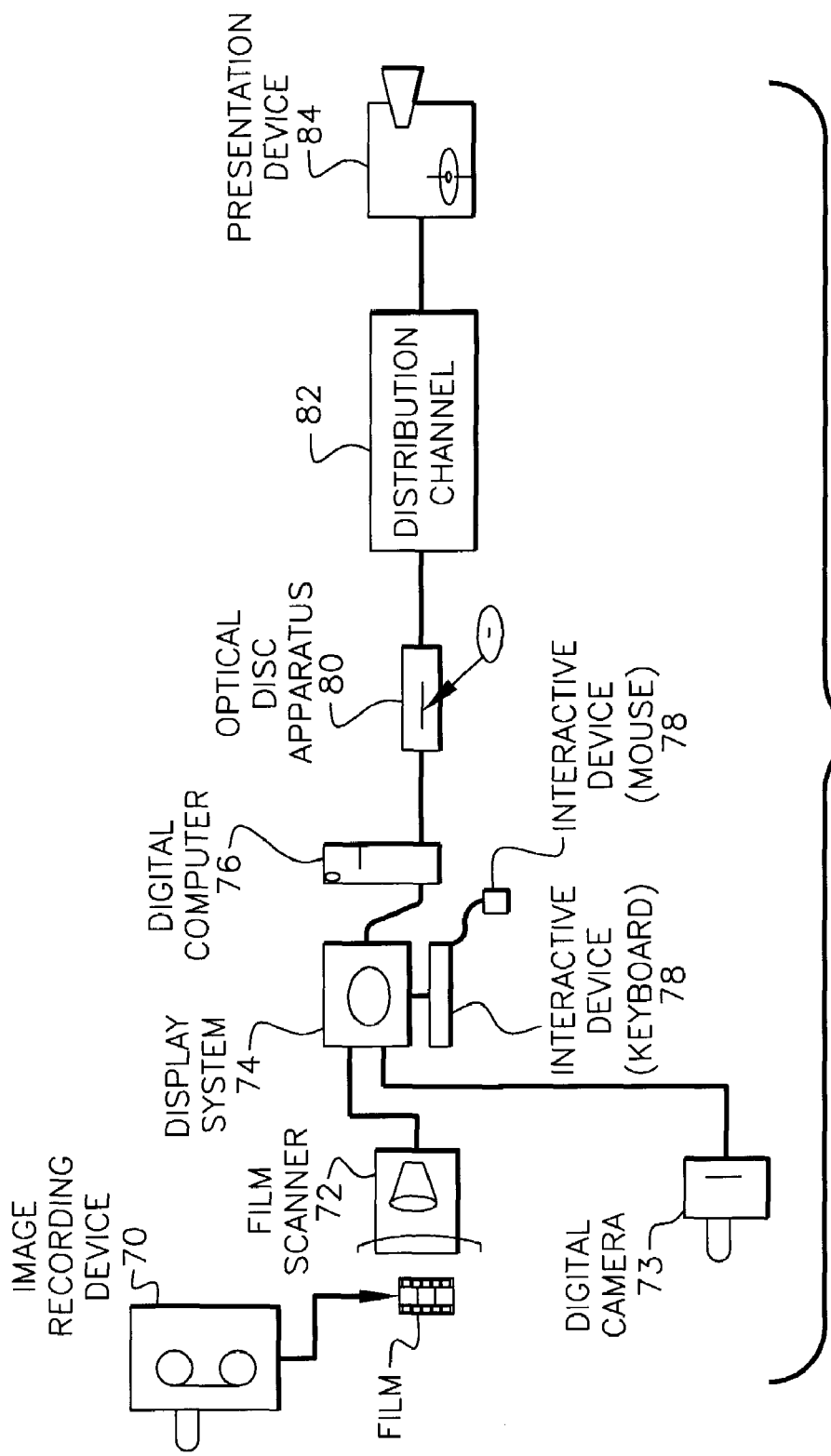
FIG. 6 is a schematic diagram illustrating a system useful for practicing the method of the present invention.

FIG. 6 illustrates the components of a system according to the present invention. These components are similar to those used by traditional motion imaging film or video systems but the display and computation components are capable of working with frames having arbitrary time duration or replication counts. In FIG. 6, an image recording device 70 such as a film, video, or digital camera, stores motion imagery of a scene. The imagery is converted to a digital format if necessary for example developing the film in a standard film processor (not shown) and scanning the film in a film scanner 72. Alternatively the digital motion image sequence can be acquired directly with a digital camera 73. The digital data representing the motion image sequence is processed in a digital computer 76 to create an image sequence having portions with different effective frame rates. The processed digital image sequence is stored on a storage medium such as an optical disc apparatus 80, or is communicated through a distribution channel 82 to a presentation device 84 where it can be presented to a viewer. The presentation device will display the image sequence at a variety of effective frame rates or a fixed multiple of the effective frame rates in the image sequence. In practice, the presentation device will have some practical limitations in frame rate. For example, the system will have a maximum rate at which data can be read from a storage medium or it may have a fixed frame or pixel refresh rate that will limit the maximum frame rate achievable.

The determination of the effective frame rate can be made in several ways. It can be arbitrarily set for different portions of an image sequence to a desired rate depending upon a priori knowledge of the scene, its components, and the desired effect. A second technique that might be employed is to automatically analyze portions of the image sequence frames to calculate the effective frame rate for that portion and use that effective frame rate. The frame rate can then change dynamically depending on the image content within that portion.

The effective frame rate can be modified to deal with other issues. For example, the effective frame rate might be reduced in response to other limitations in the system such as storage or bandwidth or computing capability, or to compensate for processing artifacts. Alternatively, the effective frame rate may be manipulated purely for some artistic effect, independently of the optimal viewing or computing concerns. An operator can interact with the image sequence to arbitrarily manipulate or select the effective rate. This is illustrated in FIG. 6 with a conventional computer 76, display system 74, interactive devices such as keyboards and a mouse 78, and storage device 80. Conventional effects, such as slow motion, are readily implemented at this point in the process.

After the image sequence is processed to optimize the rate for each frame, the sequence is stored and communicated using conventional digital storage and communication devices, such as magnetic or optical media, telecommunication systems, etc. Existing techniques, such as compression, may be employed to further optimize this process.

When delivered to a presentation venue, the processed image sequence is displayed. The presentation device reads each sequential frame in the motion sequence together with the meta-data describing the time duration or replication associated with that frame. Each image in the sequence is then presented to the viewer for the prescribed duration or number of repetitions.

In practice, the interpolated or replicated frames can be created in real time within the presentation device. In this case, the data describing the desired frame rate must be provided to the presentation device so that the appropriate interpolated frames can be created. This may reduce the communication bandwidth or storage requirement for the image sequence if the effective frame rate is anticipated to be faster overall than the original. Alternatively, the interpolated frames can be created before the image sequence is to be displayed. This approach will reduce the computational burden in the presentation device.

An effective frame rate motion imaging sequence can be created and presented to viewers even if it was initially acquired at a variable frame rate rather than a fixed rate. When processed or manipulated, the same process of determining effective frame rates can be undertaken; frames are interpolated or removed as desired and the appropriate meta-data created and associated with the corresponding frames. With variable frame rate capture, it is likely that the end result will be improved since the variable rate acquisition is likely to provide more of the necessary information.

The present invention provides a simple way to improve motion image sequences for presentation quality and storage, communication, or manipulation requirements. The invention has been described in detail with particular reference to certain preferred embodiments thereof, but it will be understood that variations and modifications can be effected within the spirit and scope of the invention.

| PARTS LIST | |
| --- | --- |
| 10 | original frame timeline |
| 12 | effective frame timeline |
| 14 | effective frame rate |
| 20 | 24-fps motion image sequence |
| 22 | 48-fps interpolated motion image sequence |
| 30 | 24-fps motion image sequence |
| 32 | 32-fps interpolated motion image sequence |
| 40 | image file storage format |
| 42 | image file storage |
| 44 | meta-data |
| 46 | file header |
| 60 | Replicated 24-fps motion image sequence |
| 62 | Replicated 32-fps interpolated motion image sequence |
| 64 | Replicated 48-fps interpolated motion image sequence |
| 70 | camera |
| 72 | digitizer |
| 73 | digital camera |
| 74 | interactive display device |
| 76 | computer |
| 78 | interactive computing interface devices |
| 80 | storage writer |
| 82 | distribution channel |
| 84 | presentation device |

What is claimed is:

1. A method of recording and processing a digital motion image sequence, comprising the steps of:
   a) recording a digital motion image sequence at a capture frame rate;
   b) determining different variable frame rates for different portions of the image sequence that are different from the capture frame rate and are a function of the scene image content changes between frames in the different portions of the image sequence;
   c) processing the digital motion image sequence to produce a processed digital motion image sequence having portions with the determined different variable frame rates; and
   d) displaying the processed digital motion image sequence at different frame rates in different portions of the image sequence, on a display device, according to the determined different variable frame rates previously determined as a function of the scene image content in the different portions of the image sequence.

2. The method claimed in claim 1, wherein the processing step includes processing the portions to have different display frame rates corresponding to the determined different variable frame rates.

3. The method claimed in claim 1, wherein the processing step includes processing the portions to have the same fixed display frame rate and further comprising the step of displaying the processed digital image sequence at the fixed display frame rate, and wherein the displayed frame rate is greater than the determined different variable frame rate for at least one portion of the digital image motion sequence.

4. The method claimed in claim 1, wherein the step of processing includes one or more processing steps selected from the group comprising frame replication, frame interpolation and frame deletion.

5. The method claimed in claim 4, wherein the step of frame interpolation comprises motion vector interpolation.

6. The method claimed in claim 1, wherein the step of: determining the different variable frame rates, is performed by an operator.

7. The method claimed in claim 1, wherein the step of determining the different variable frame rates is performed automatically.

8. The method claimed in claim 1, further comprising the steps of compressing the digital motion image sequence after the recording step; delivering the compressed digital motion image sequence to a remote location; and decompressing the compressed digital motion image sequence prior to processing.

9. The method claimed in claim 1, further comprising the step of compressing the processed digital motion image sequence.

10. The method claimed in claim 1, wherein the capture frame rate is a constant frame rate.

11. The method claimed in claim 1, wherein the capture frame rate is a variable frame rate.

12. The method claimed in claim 2, wherein the processed digital motion image sequence includes information describing a frame display duration for each frame.

13. The method claimed in claim 3, wherein the processed digital motion image sequence includes instructions for replicating a frame, and wherein the display step further includes replicating frames according to the instructions in the display device.

14. The method claimed in claim 2, wherein the processed digital motion image sequence includes instructions for interpolating between frames and wherein the displaying step includes interpolation frames according to the instructions in the display device.

15. The method claimed in claim 3, wherein the processed digital motion image sequence includes instructions for interpolating between frames and wherein the displaying step includes interpolating frames according to the instructions in the display device.

16. The method claimed in claim 1, wherein the processing step is performed by a digital computer.

17. The method claimed in claim 9, wherein the compression is MPEG compression.

18. The method claimed in claim 1, wherein the recording step includes capturing a motion image sequence on silver halide film, developing the film, and scanning the film to produce a digital motion image sequence.

19. The method claimed in claim 1, wherein the recording step includes capturing a motion image sequence with a video camera and digitizing the captured sequence.

20. The method claimed in claim 1, wherein the recording step includes capturing a motion image sequence with a digital camera.

21. A system for recording and processing a digital motion image sequence, comprising:
  a) a digital motion image recorder for capturing a digital image motion sequence at a capture frame rate;
  b) an editing station for determining different variable frame rates for different portions of the image sequence as a function of the scene image content changes between frames in different portions of the image sequence;
  c) a digital image processing computer for processing the digital motion image sequence to produce a processed digital motion image sequence having portions with the determined different variable frame rates in different portions of the image sequence;
  d) a presentation device for displaying the processed digital image sequence at different frame rates for different portions of the image sequence.

22. The system claimed in claim 21, wherein the computer includes means for processing the portions to have different display frame rates corresponding to the determined different variable frame rates.

23. The system claimed in claim 21, wherein the computer includes means for processing the portions to have the same fixed display frame rate, and wherein the display frame rate is greater than the determined different variable frame rate for at least one portion of the digital image motion sequence.

24. The system claimed in claim 21, wherein the processing includes one or more processing functions selected from the group comprising frame replication, frame interpolation and frame deletion.

25. The system claimed in claim 24, wherein the frame interpolation function comprises motion vector interpolation.

26. The system claimed in claim 21, wherein the editing station is adapted to be operated by an operator.

27. The system claimed in claim 21, wherein the editing station performs automatically.

28. The system claimed in claim 21, wherein the capture frame rate is a variable frame rate.

29. The system claimed in claim 21, wherein the capture frame rate is a fixed frame rate.

30. The system claimed in claim 22, wherein the processed digital motion image sequence includes information describing a frame display duration for each frame and the presentation device is responsive to the information to display each frame for the specified duration.

31. The system claimed in claim 23, wherein the processed digital motion image sequence includes instructions for replicating a frame, and wherein the presentation device further includes means for replicating frames according to the instructions.

32. The system claimed in claim 22, wherein the processed digital motion image sequence includes instructions for interpolating between frames and wherein the presentation device includes means for interpolating frames according to the instructions.

33. The system claimed in claim 23, wherein the processed digital motion image sequence includes instructions for interpolating between frames and wherein the presentation includes means for interpolating frames according to the instructions.

34. The system claimed in claim 21, wherein the motion image recorder includes a motion picture camera for capturing a motion image sequence on silver halide film, a film processor, and a scanner for scanning the film to produce a digital motion image sequence.

35. The system claimed in claim 21, wherein the motion image recorder includes a video camera for capturing a motion image sequence and means for digitizing the captured sequence.

36. The system claimed in claim 21, wherein the motion image recorder is a digital camera.

* * * * *